ROBERT M. LAFFERTY.
Pumps.
No. 5,441. Reissued June 10, 1873.
Fig. 1.
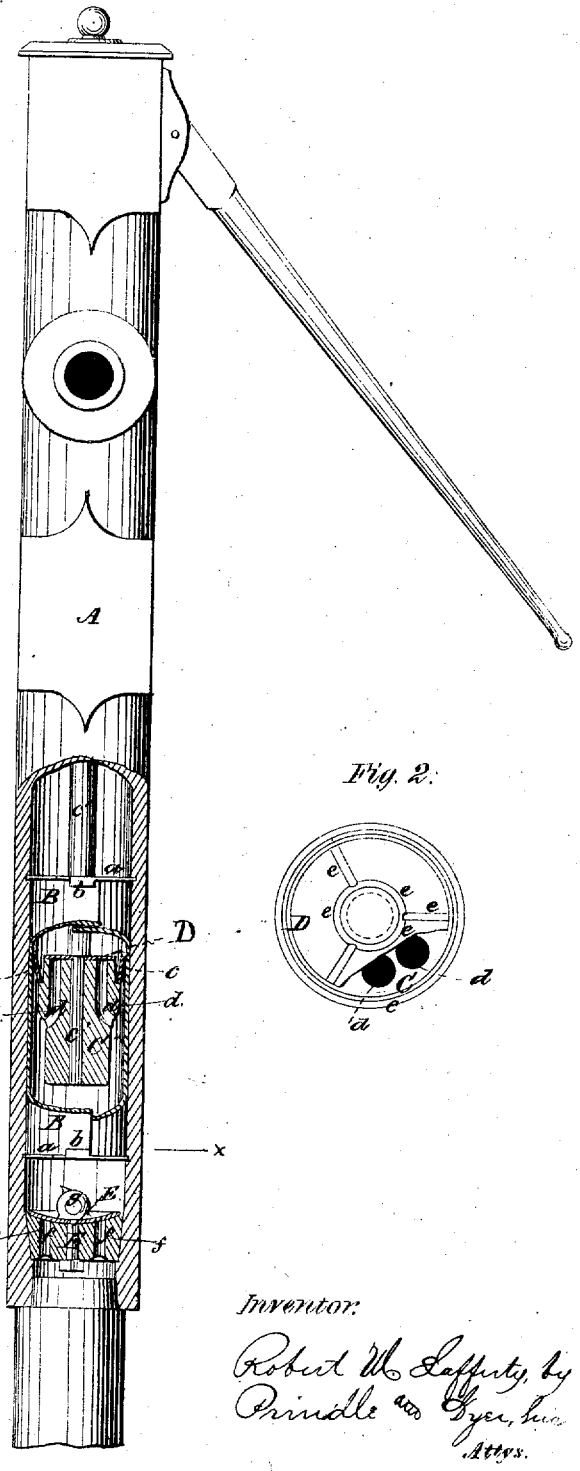
Fig. 3.
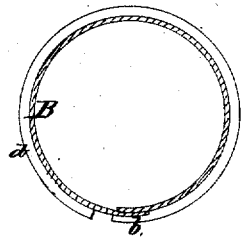
Fig. 4.
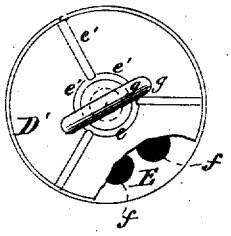
Fig. 2.
Witnesses.
A. E. L. Merle
John R. Young
Inventor:
Robert M. Lafferty, by
Prindle and Dyer, his
Attys.
AM. PHOTO-LITHOGRAPHIC CO. N.Y. (OSBORNE'S PROCESS.)

UNITED STATES PATENT OFFICE.

ROBERT M. LAFFERTY, OF TOLEDO, OHIO, ASSIGNOR TO HIMSELF AND E. P. SMITH.

IMPROVEMENT IN PUMPS.

Specification forming part of Letters Patent No. 104,603, dated June 21, 1870; reissue No. 4,678, dated December 19, 1871; reissue No. 5,441, dated June 10, 1873; application filed February 8, 1873.

DIVISION B.

*To all whom it may concern:*

Be it known that I, ROBERT M. LAFFERTY, of Toledo, in the county of Lucas and State of Ohio, formerly of Three Rivers, in the county of St. Joseph and State of Michigan, have invented a new and useful Improvement in Pumps; and I do declare that the following is a true and accurate description thereof, reference being had to the accompanying drawings, and to the letters of reference marked thereon and being a part of this specification, in which—

Figure 1 is an elevation, partially in section, of my improved pump. Fig. 2 is a plan, partially in section, of the pump-piston. Fig. 3 is a horizontal section of the lining of the pump-head or stock, on the line *x x*, in Fig. 1. Fig. 4 is a plan of the foot-valve.

Like letters refer to like parts in each figure.

The nature of this invention relates to an improvement in the construction of wooden pumps, and consists in the novel construction of the piston and valves, and in the ingenious arrangement of the various parts, as more fully hereinafter described.

In the accompanying drawings, A represents a wooden pump-head or stock, which is attached to a pipe or tube terminating in the water, and within which the working parts are arranged, as shown in Fig. 1. B is a sheet-metal lining, suitably secured in said stock. C is a piston, attached to the reciprocating piston-rod C′, operated in the usual manner. *c* is a cup-leather or packing, secured around the top of the wooden piston, which is chamfered at its edge to form an annular water-chamber between it and the cup-leather, reaching nearly down to the base of the leather, and wedging it outwardly in the upward stroke of the piston. The lower half of the piston is diminished in diameter, as shown, and from this part a row of openings, *d*, enter the piston and are carried up through its top, as shown in Fig. 1.

In the ordinary mode of constructing such pistons the openings for the passage of the water are bored directly through them, weakening them to such an extent that they readily split off. In the present form the liability to split is avoided by carrying the lower solid part of the piston well below the entrance of the openings, thus insuring great strength therein.

D is a disk, of leather or rubber, forming a valve or series of valves, secured by a shoulder in the rod to the center of the piston, in such a manner as to give great flexibility to the disks. It is radially and concentrically grooved, as shown at *e*, Fig. 2, the parts between the grooves forming valves, which in the downward stroke are enabled to rise by reason of the flexibility of the grooved parts of the disk. E is a plug, perforated with suitable openings *f* for the admission of water. D′ is a disk forming the foot-valve, constructed as above described, and centrally secured to the plug by the eye-bolt *g*, by means of which the plug may be withdrawn from the pump-barrel, if desired. The plug E differs in construction from those in ordinary use in this, that its top is concaved or cup-shaped to about the shape that the valves would assume from use, so that, where there is not the weight of a high column of water imposed on the valve, it will readily close down on the upper surface of the plug. When a pump barrel and tube are of the same diameter, the lining may be carried down to the bottom of the barrel, and held in place by the upper end of the tube, expanding it outward against the walls of the barrel.

What I claim as my invention, and desire to secure by Letters Patent, is—

1. The piston C, provided with the curved opening *d* and with the cup-leather, or equivalent, and valve D, when each of the parts is constructed and arranged to operate substantially as and for the purposes specified.

2. The piston C and valve D, in combination with the plug E, with concave upper face, as described, openings *f*, and cup-leathers or equivalents, all constructed and arranged to operate as and for the purpose set forth.

3. The arrangement of the barrel A, lining B, piston C, plug E, and valves D D′, when the parts are constructed and combined substantially in the manner and for the purposes set forth.

ROBERT M. LAFFERTY.

Witnesses:

THOS. S. SPRAGUE,

H. S. SPRAGUE